United States Patent [19]

Homel et al.

[11] Patent Number: 5,082,171
[45] Date of Patent: Jan. 21, 1992

[54] BOOK RETURN WITH COLLAPSIBLE BAG RECEPTACLE

[75] Inventors: Randall J. Homel; Jeffrey R. Swagel, both of Green Bay, Wis.

[73] Assignee: Highsmith Company, Inc., Fort Atkinson, Wis.

[21] Appl. No.: 559,729

[22] Filed: Jul. 30, 1990

[51] Int. Cl.$^5$ .............................................. B65D 91/00
[52] U.S. Cl. .................. 232/43.2; 232/43.1; 232/44; 220/93
[58] Field of Search ............................ 232/43.1–43.5, 232/44, 47; 383/2, 120; 220/404, 409, 85 B, 93

[56] References Cited

U.S. PATENT DOCUMENTS

| | | | |
|---|---|---|---|
| 1,248,584 | 12/1917 | Williams | 232/47 |
| 1,767,274 | 6/1930 | Broderick . | |
| 2,319,872 | 5/1943 | Leonard | 220/93 |
| 2,458,868 | 1/1949 | Miller | 232/43.5 |
| 2,581,621 | 1/1952 | Behrens et al. . | |
| 2,617,584 | 11/1952 | Behrens | 232/44 |
| 3,223,432 | 12/1965 | Nicolaci | 220/93 |
| 3,495,762 | 2/1970 | Verbic | 229/53 |
| 3,746,066 | 7/1973 | McIntyre | 150/33 |
| 3,799,430 | 3/1974 | Huguenin | 232/43.2 |
| 3,863,561 | 2/1975 | Karls | 100/53 |
| 3,976,345 | 8/1976 | Walters | 312/333 |
| 3,981,436 | 9/1976 | Neal | 232/43.2 |
| 4,055,201 | 10/1977 | Fowler | 139/421 |
| 4,176,610 | 12/1979 | Markham et al. | 109/59 R |
| 4,278,163 | 7/1981 | Tomich | 193/34 |
| 4,517,901 | 5/1985 | Clark | 109/19 |
| 4,573,416 | 3/1986 | Masachika | 109/66 |

FOREIGN PATENT DOCUMENTS 756371  4/1967 Canada ................................ 232/44

OTHER PUBLICATIONS

Books, Trucks and Library Equipment, 201-202, Highsmith Catalog.
Kingsley Library Equipment Catalog.
Gaylord Book Return.

*Primary Examiner*—Gary L. Smith
*Assistant Examiner*—F. Saether
*Attorney, Agent, or Firm*—Lathrop & Clark

[57] ABSTRACT

A book return is disclosed which has a book storage container which has a support structure. A collapsible container has an upper peripheral edge which is affixed to the upper edge of the support structure. An elastic cord provides support between a first attachment point located at the bottom of the collapsible container and a second attachment point located on the support structure and spaced from the first attachment point so that the collapsible container is held in a substantially collapsed condition when the container is empty and expands to substantially fill the volume defined by the support structure as additional books are added. The book return also has a casement which defines a door compartment having a frontal access opening and a rear discharge opening. A sector-shaped door has a book guide surface and is attached to the casing about a horizontally-pivoted axis. A gate is pivotally attached to the rear of the door. The gate prevents access to the storage container when the sector-shaped door is open, and locks the sector-shaped door closed when the book drop is full.

20 Claims, 6 Drawing Sheets

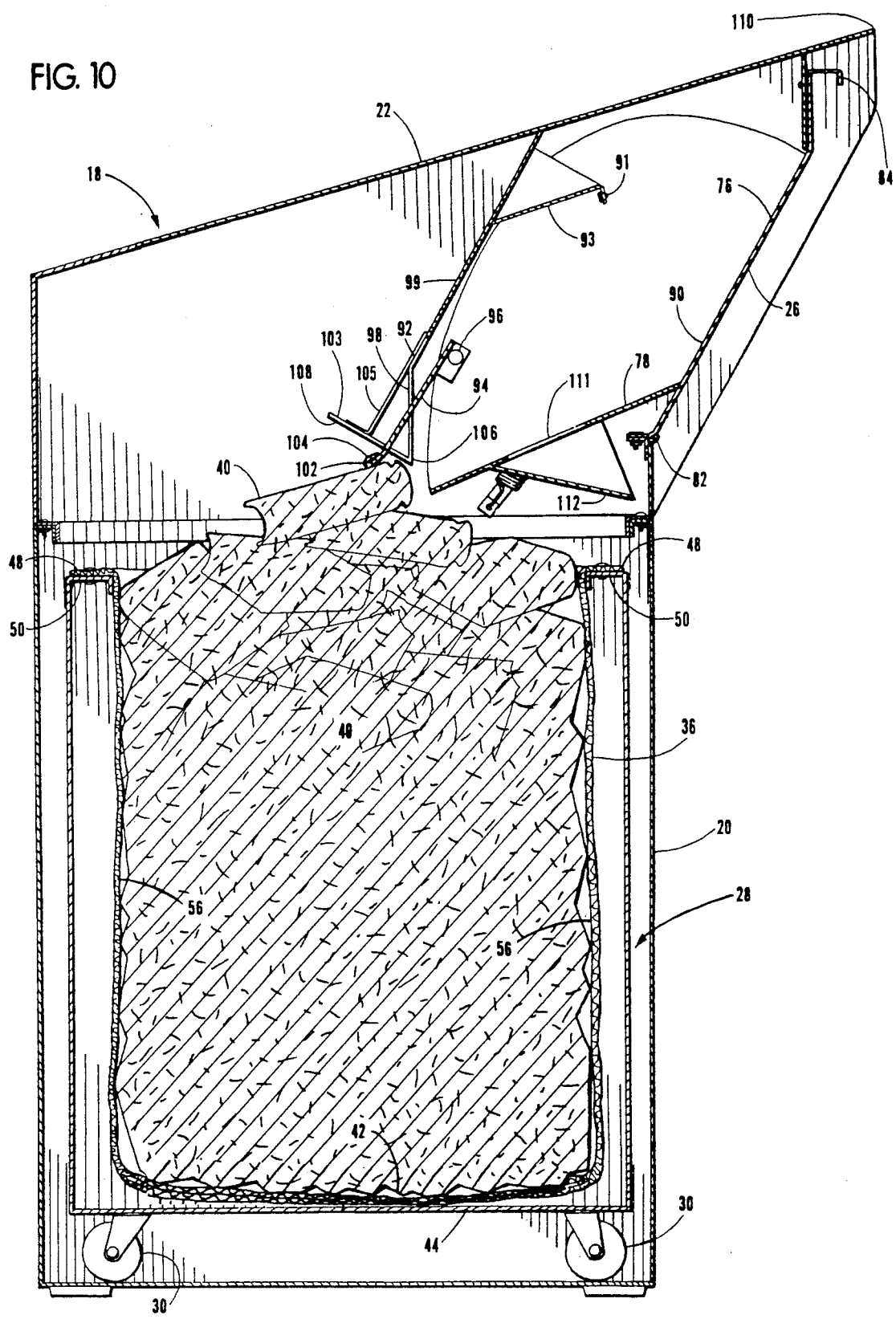

5,082,171

BOOK RETURN WITH COLLAPSIBLE BAG RECEPTACLE

FIELD OF THE INVENTION

This invention relates to book returns for receiving and storing books.

BACKGROUND OF THE INVENTION

Book returns are used by libraries and other institutions which lend books and other materials which are required to be returned within a set period of time. Book returns are useful where it is desirable to allow the borrower of materials to return them when the library or institution is closed. Book returns also make the return of materials more convenient by allowing books and materials to be returned without entering the building in which the library or institution is located. For even greater convenience, book returns may be located adjacent to a driveway or street facilitating the return of materials by a driver or passenger of a vehicle without leaving their vehicle.

An effective book return should achieve two integrated and related functions. First, it should receive the book or returned item by means of a door and pass it through to a storage container or area in such a way that it cannot be retrieved by the depositor or any unauthorized person. Known book returns employ sector-shaped doors which are pivotally mounted within a casement and are rotatively movable from an open to a closed position so that a book may be inserted into the open door, then dropped into the storage area when the door is closed. Some returns have a pivotally-mounted gate covering the rear discharge opening such that the gate can be held closed by a guide surface within the casement when the pivotally movable door is opened for deposit, thereby preventing access to the book storage area when the book deposit door is open. Although access to the interior is prevented, books may continue to be placed within the deposit door after the storage capacity of the container has been exhausted. Books placed within the door, but blocked from admittance to the container by the books within, remain accessible to weather damage or pilferage.

A book return should also prevent damage to the books when they drop into the storage container or area after passing through the depository door. If the books fall more than a foot or so the force of impact may damage them. One mechanism for maintaining a short drop distance is a self-lowering container tray, suspended by metal springs from the container rim. In this way this mechanism gives the storage container a relatively shallow depth when books first are loaded therein, but as more books are loaded the weight of the books forces the tray down, thereby providing more room for subsequently loaded books.

Frequently books, or the return cards associated with them, drop down between the movable container tray and the side walls of the container. Exposed springs which are used to support the container tray may trap the corners of books and cards. To retrieve books and cards trapped beneath the shelf, librarians must reach through a side hole, a process which is cumbersome and which may result in fingers pinched in the springs. Furthermore, container volume which would otherwise be available for storing books is occupied by the springs which extend beneath the tray.

In order to most efficiently utilize the space available in the book storage container, it is desirable that the mechanism for lowering the bottom of the container be as space efficient as possible.

A book deposit is needed which is inaccessible to further deposits when the book container is full and which effectively utilizes the book container capacity while precluding the trapping of books or cards in the container.

SUMMARY OF THE INVENTION

The book return of the present invention has a book storage container which has a support structure which is open at the top with a peripheral edge. A collapsible container with a bottom is open at the top and has an upper peripheral edge which is affixed to the upper edge of the support structure. The collapsible container in an uncollapsed state substantially fills the volume defined by the support structure. A load-responsive support, which is preferably an elastic cord provides load-responsive support between a first attachment point located at the bottom of the collapsible container and a second attachment point located on the support structure and spaced from the first attachment point so that the collapsible container is held in a substantially collapsed condition when the container is empty and expands to substantially fill the volume defined by the support structure as additional books are added. The book return also has a casement which defines a door compartment having a frontal access opening and a rear discharge opening. A sector-shaped door has a book guide surface and is attached to the casing about a horizontally-pivoted axis near the bottom of the casing between the frontal access opening and the rear discharge opening. The door is pivotable between a closed and an open position. A gate is horizontally pivotally attached to the rear of the door at the top of the gate, such that the gate covers the rear discharge opening. A guide member is attached to the bottom of the gate such that the guide member will be displaced upwardly by a book deposited in the container when the book container is full. An inner guide surface is connected to the casing and spaced from the door and is adapted to restrict access through the gate by action on the guide member, when the door is opened. An outer guide surface is connected to the casing opposite the inner guide surface. The outer guide surface constrains the upwardly displaced guide member as the sector-shaped door is opened to prevent the door from opening, such that the door will freely open when the container is not filled with books but will be prevented from opening when the container is full.

It is an object of the present invention to provide a book return which locks against deposits when the book container is full.

It is a further object of the present invention to provide a book receiving container in which the books are fully contained by a bag and cannot fall out.

It is also an object of the present invention to provide a self-lowering bottom in a book container wherein the support mechanism for the bottom of the container is not exposed to the books.

It is yet another object of the present invention to provide a book storage container with more useable volume.

It is yet a further object of this invention to reduce the noise associated with a book deposit through the use of a book container wherein no metal is contacted by the books when they drop into the storage container.

It is also a further object to contain the springs or elastic members which support the collapsible bag of a book receptacle isolated from the user.

Further objects, features and advantages of the invention will be apparent from the following detailed description when taken in conjunction with the accompanying drawings.

BRIEF DESCRIPTION OF THE DRAWINGS

FIG. 10 is a cross-sectional view of the locked book return of FIG. 9.

DESCRIPTION OF THE PREFERRED EMBODIMENT

Figure 1:
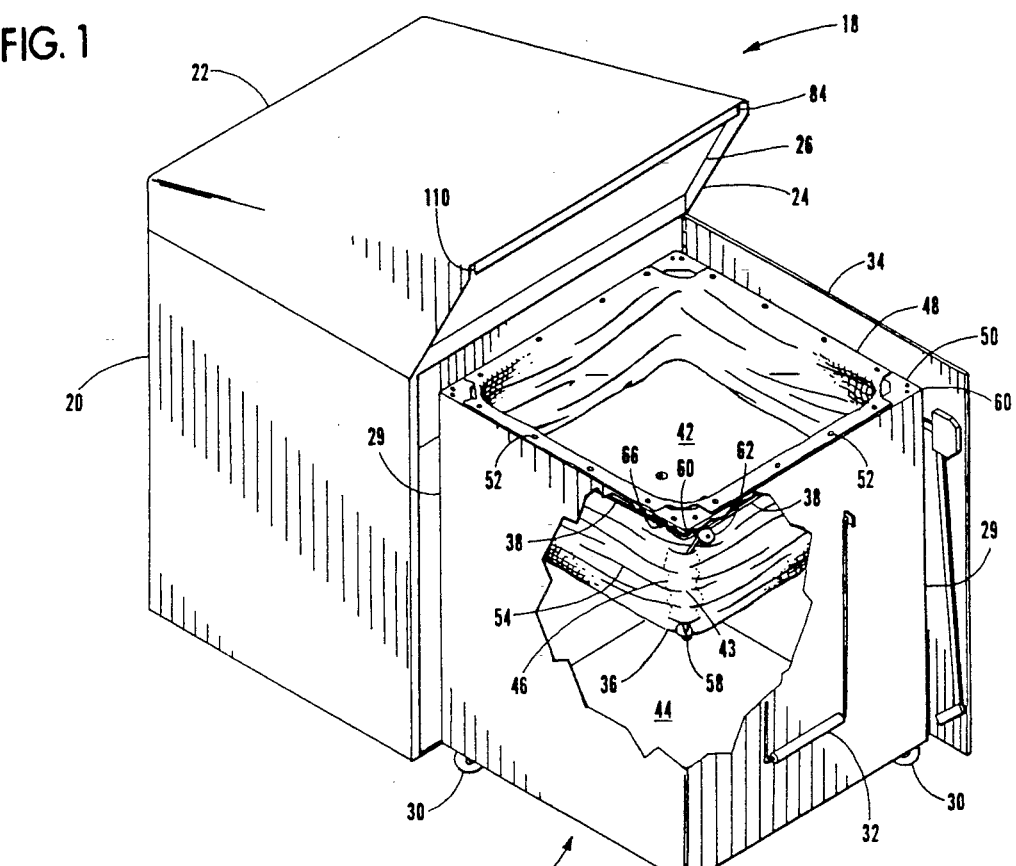
FIG. 1 is a perspective view of the book return of this invention with the book container partially removed and cut away to show a collapsible container therein.

Referring more particularly to FIGS. 1-10 wherein like numbers refer to similar parts, a book return 18 having a chest 20 is shown in FIG. 1. The chest encloses an interior space 100 over which is mounted a casement 22. In the front of the casement 24 is located a sector-shaped door or chute 26 which is pivotally movable from an open to a closed position. A removable book container 28 fits within the chest 20. The book container 28 is preferably rectangular with vertical side walls 29 forming a right prismatic support structure. The book container 28 preferably rides on caster wheels 30 and may be removed from the chest 20 and towed by a handle 32 for ease of moving the books from the book return 18 to the library or institution where they may be recataloged and shelved. The chest door 34 may be locked and so restrict access to the returned books to authorized persons.

Portions of the removable book container 28 are cut away in FIG. 1 to show an inner collapsible container or bag 36. Load responsive supports which are preferably elastic cords 38 support the bottom 42 of the collapsible bag 36, and hold the collapsible bag in a substantially collapsed position when it is not loaded with books. Although elastic cords are preferred, the load responsive means could also be supplied by springs, air pistons, or other equivalent structure.

Figure 2:
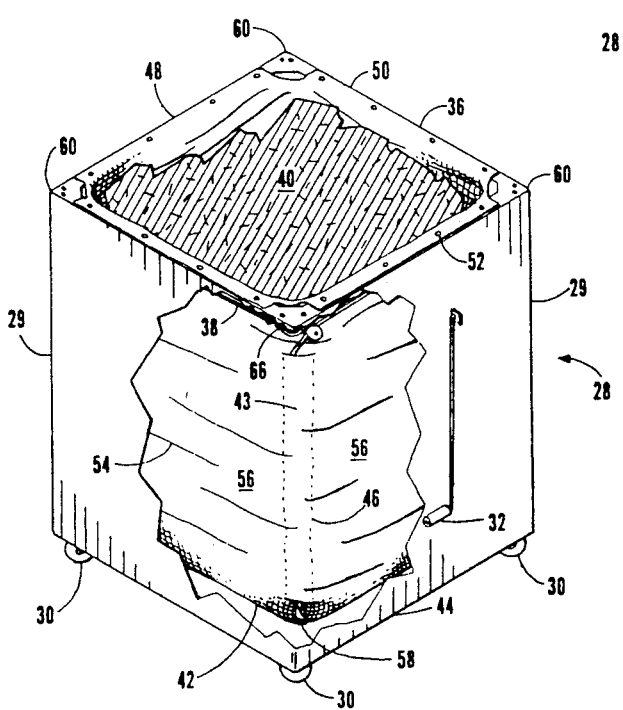
FIG. 2 is a perspective view of the removed book container of FIG. 1 cut away to show the collapsible container in a fully extended position.

When the collapsible bag 36 within the book container 28 is filled with books 40, as best shown in FIG. 2, the weight of the books forces the bottom of the bag 42 to its full extension where it rests closely spaced from or on the bottom 44 of the removable book container 28. The elastic cords 38 respond to the load by lengthening and so allowing the bag 36 to extend until the books resting on the bottom of the bag 42 reach the bottom of the book container 44. Cloth sleeves 46 are formed on the edges 43 of the bag 36 where the sides of the bag 56 meet and through which the elastic cords 38 extend. Because of the sleeves 46, the cords are not accessible from either the inside of the collapsible bag 36 or the outside of the removable book container 28 under normal operation. Thus the cords are not exposed to possible entanglement with the operator or books.

Figure 3:
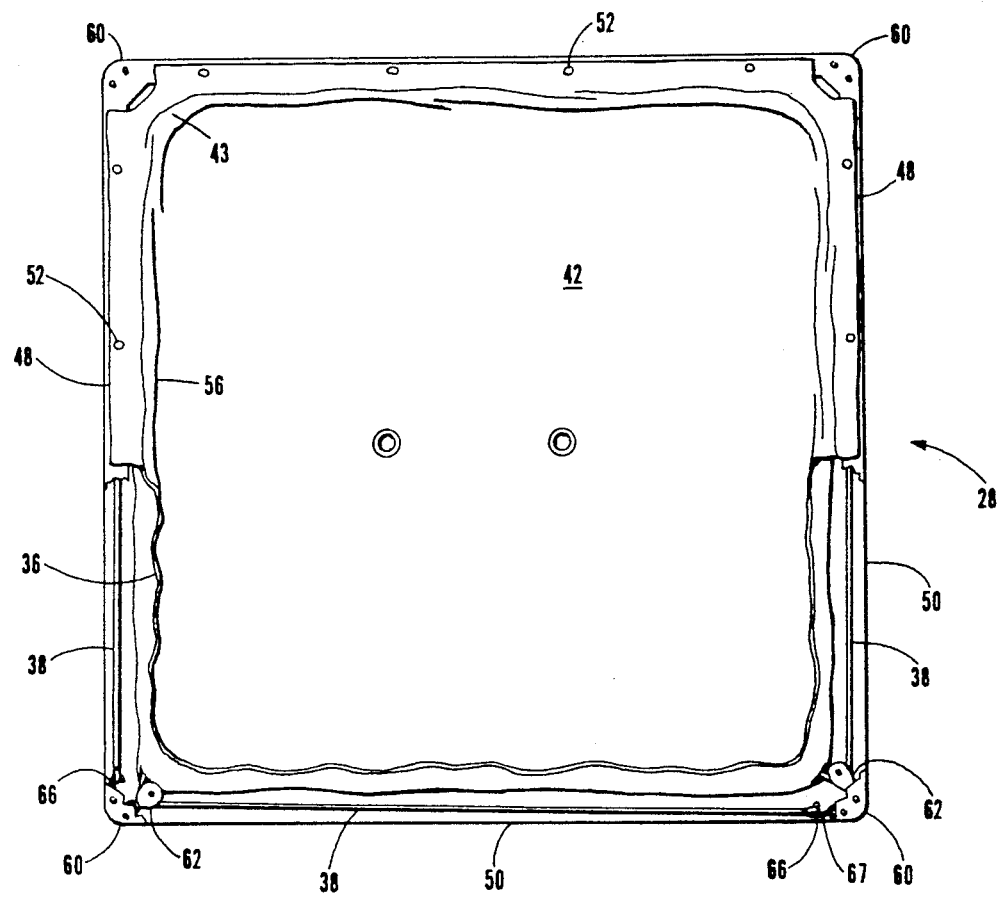
FIG 3 is a top plan view of the removable book container of the book return of FIG. 1 cut away to show the elastic supports and pulleys of the collapsible container.
Figure 4:
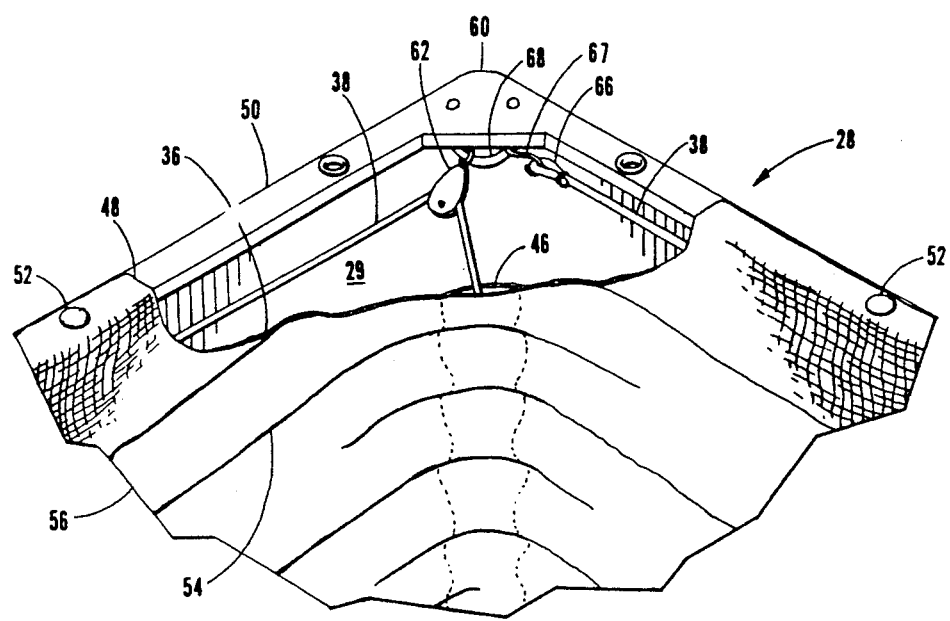
FIG. 4 is a fragmentary perspective view of the elastic support mechanism of the collapsible container of FIG. 3.

As best shown in FIG. 3, the collapsible bag 36 is nested within the removable book container 28 and attached by an upper peripheral edge 48 to the upper peripheral edge of the removable container 50 by an attachment means 52 herein shown as two-part removable snaps. When the bag 36 is empty, as shown in FIGS. 1, 3 and 4, pleats or folds 54 are formed where the walls 56 of the collapsible bag 36 are compressed by the cords 38. The bag 36 is preferably formed of one or more layers of durable fabric such as woven nylon or canvas with reinforcing straps 57 to support the load of the books 40. However, the collapsible container 36 could be constructed of metal, plastic or the like, formed with hinges or accordian folds, so as to make a collapsible container. The bag 36 may be removed from the container 28 as needed for cleaning, maintenance, repair, or replacement.

Figure 5:
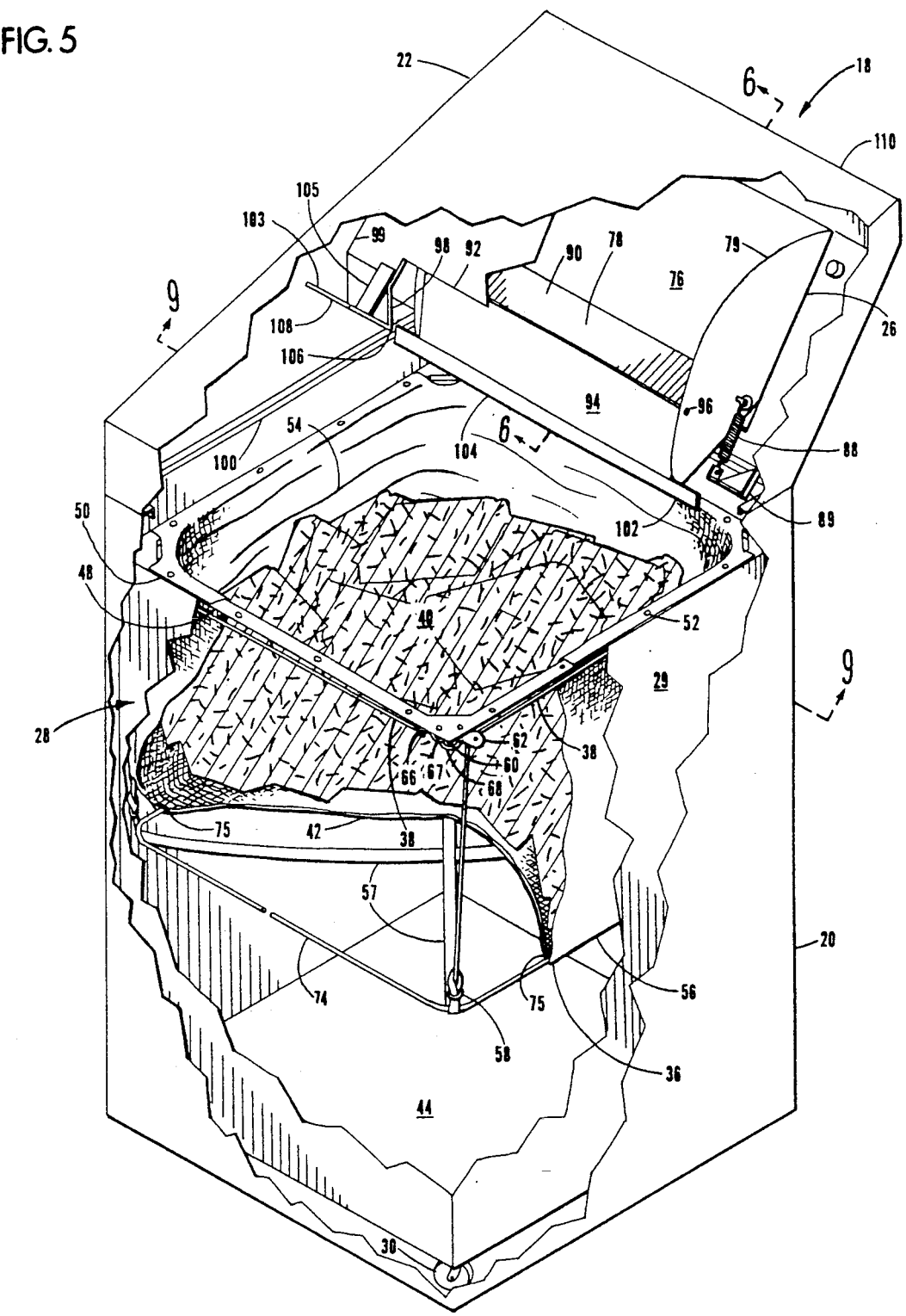
FIG. 5 is a rear perspective view of the book deposit of FIG. 1, with the removable book container fully inserted within the deposit and cut away to show the collapsible book container partially loaded with books.

As shown in the cut-away view of FIG. 4, a cord 38 is connected at each corner 60 of the removable book container 28. As shown in FIG. 5, each elastic cord 38 load responsive support is preferably attached by a square knot at a first attachment point 58 to the looped ends of flexible reinforcing straps 57 which cross and are sewn to the bottom 42 of the bag 36. Each cord 38 travels through a cloth sleeve 46 in the edge 43 of the collapsible bag 36 to a corner 60 of the removable book container 28 where the elastic cord 38 passes through and over a pulley 62 which turns the elastic cord 38 90° parallel to the side wall 29 of the removable bock container 28. Where the elastic cord 38 reaches the next adjacent corner 60 of the removable book container 28, it is attached at a second attachment point 66 which is preferably a clip 67 connected to a bracket 68. The pulley block 62 and the clip 67 are preferably attached to a common bracket 68 in each of the corners 60 of the removable book container 28.

The pulleys 62 permit the use of flexible cords of a length greater than the depth of the container 28 hence affording a greater degree of flexible extension for a cord of a particular elasticity. It should be noted that, with the proper elastic material, the cords could alternatively be attached at a second attachment point directly above the first attachment point, eliminating the need for a pulley.

As shown in FIG. 5, the collapsible bag preferably has a rigid bent metal frame 74 installed in a pocket 75 formed by two layers of fabric in the bottom of the collapsible bag 36. The rigid frame 74 holds the bottom of the collapsible bag 36 in an extended position such that it may substantially fill the open area of the removable book container 28. The frame 74, together with the bag bottom 42, forms a resilient bottom 42 to the collapsible bag 36 so that when books fall upon it their fall is cushioned and relatively little noise is produced. As the collapsible bag 36 is loaded with books, the elastic cords 38 lower the bag bottom in response to the load imposed by the books. Thus, when the books fall into the collapsible bag 36, they fall relatively constant and relatively short distances and when the bag 36 is being unloaded, the books further down in the bag are automatically lifted up into reach as the books on top are removed.

Figure 7:
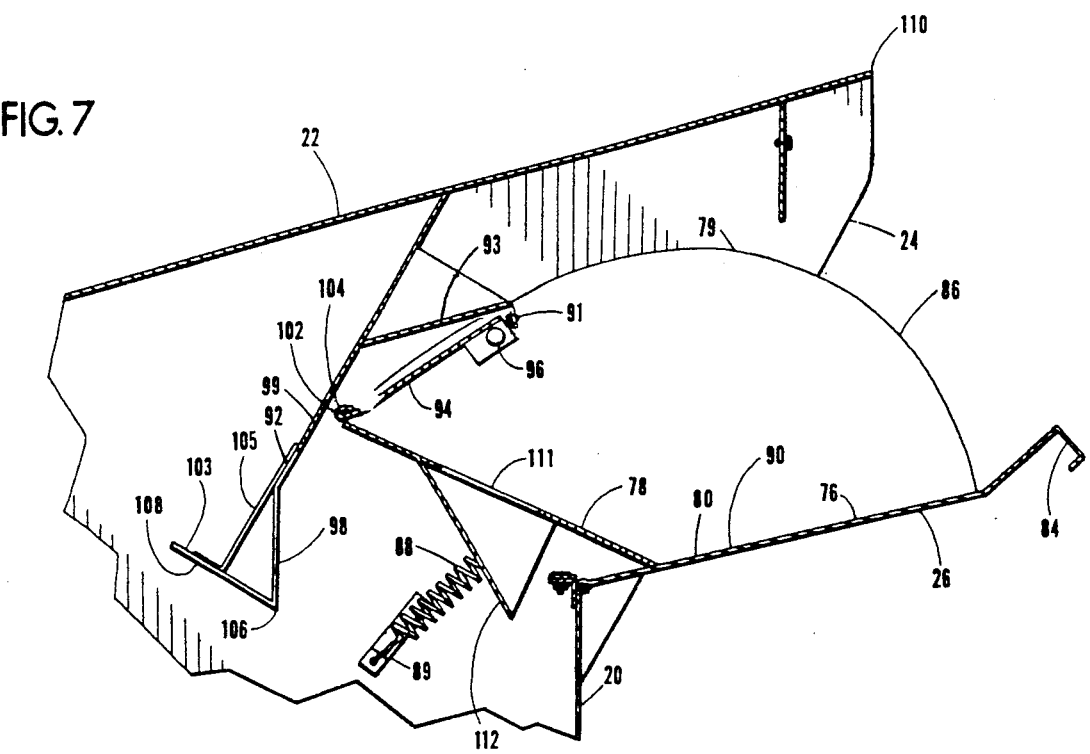
FIG. 7 is a cross-sectional view of the book deposit of FIG. 6 in which the book return door is open.

As shown in FIG. 1, 5 and 7 the casement 22 in which the sector-shaped door 26 is mounted, in the preferred embodiment, has a square base adapted to fit onto the chest 20 so that the casement 22 may be rotated in 90° increments such that the chest door 34 may be installed in any orientation relative to the front of the casement where the front opening 86 into which books 40 are deposited is located. Thus, the front opening 86 and the chest door 34 may be located on the same side (as shown in FIG. 1), or on opposite sides, 90° to the right or 90° to the left. This feature of the book return allows it to be conveniently used near a curb for curbside drop off wherein the books are deposited from the street side, and the removable book container 28 is removed from the opposite side. Where the book return is located for walk up deposits next to a sidewalk, the chest door 34 may be located on the same side as the front opening 86 so that the removable book container 28 can be pulled forward onto the sidewalk.

Figure 6:
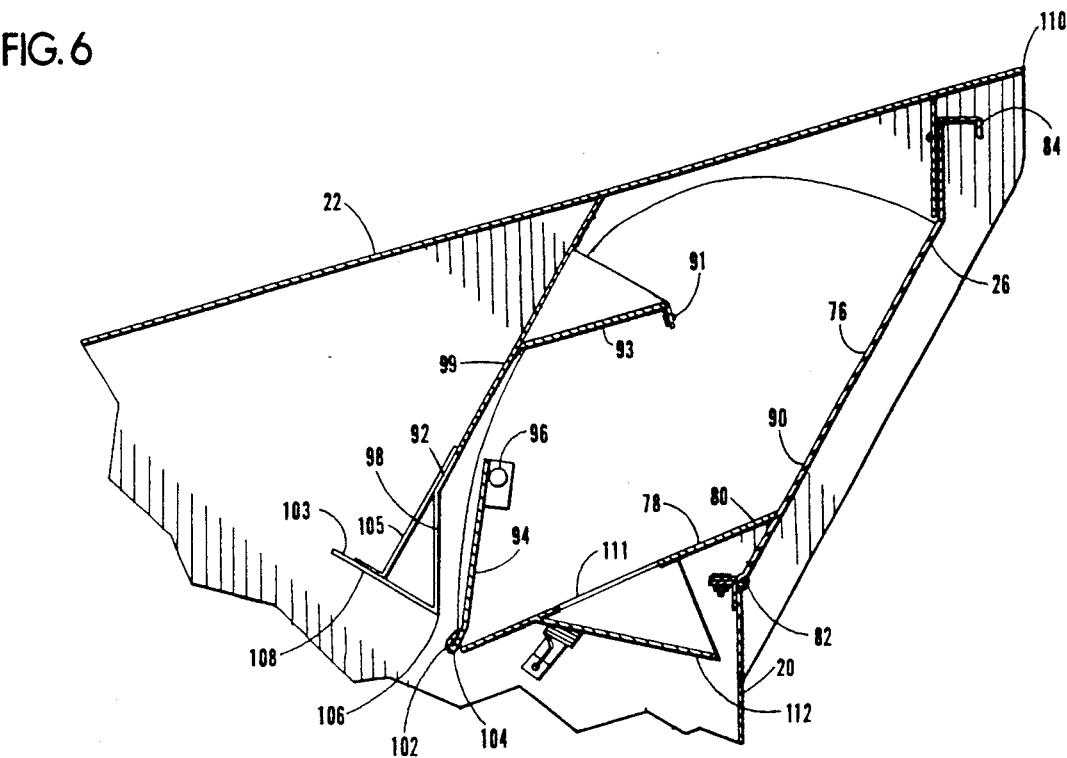
FIG. 6 is a cross-sectional view of the book deposit of FIG. 5 taken along section lines 6—6, showing the book deposit casement and book return door in a closed position.
Figure 8:
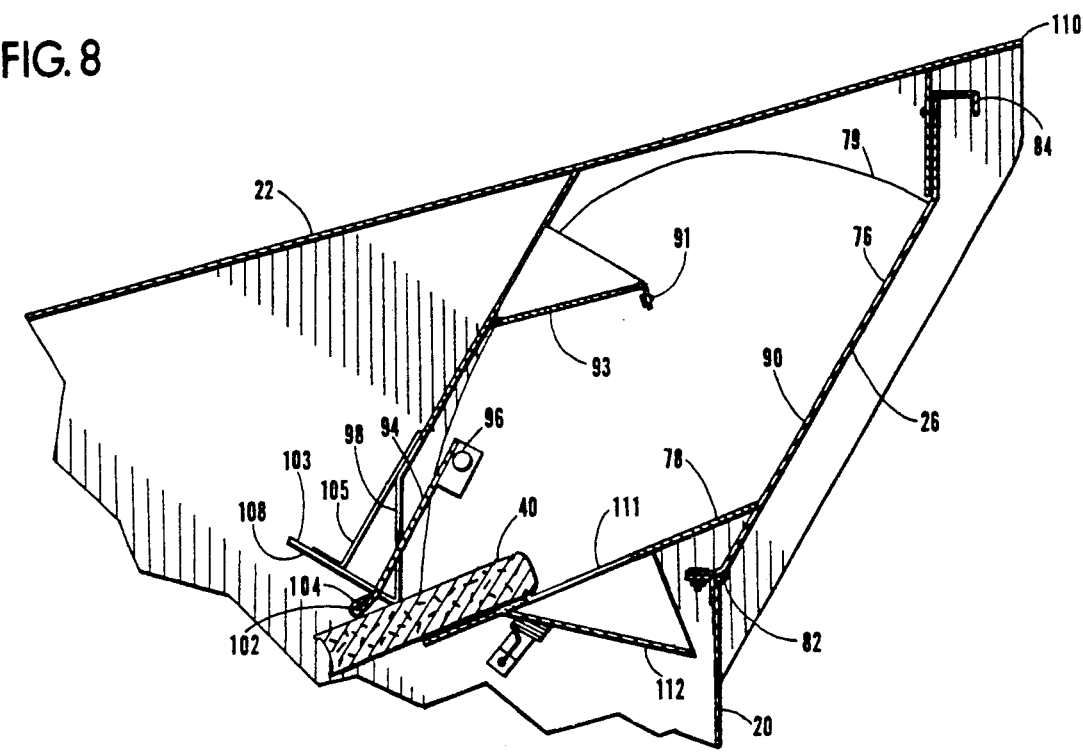
FIG. 8 is a cross-sectional view of the book deposit of FIG. 6 with the book deposit door closed showing a book passing through rear gate.

As best shown in FIGS. 6-10, the sector-shaped door 26, together with the casement 22 and a gate 94, functions to admit books when the container 28 is partially filled, but locks against further deposits when the container is full. The sector-shaped door 26 has a first surface 76 and a second surface 78, and upright sides 79, angled from one another which together with the casement 22 form a compartment 80. The sector-shaped door is horizontally pivotable about the horizontal pivot 82 between an open position as shown in FIG. 7 and a closed position as shown in FIGS. 6 and 8. The pivot 82 is preferably a hinge which connects the door 26 to the casement 22. The door 26 has a door handle 84 by means of which a depositor may open the door 26 to expose a front opening 86 in the casement 22 into which books 40 may be deposited. The first surface 76 is angled from the second surface 78 such that when the door is opened the first surface forms a generally horizontal shelf for the convenient placement of books, as seen in FIG. 7. The second surface extends upwardly away from the first surface, together with the gate 94 blocking access through the rear opening 92. Door return springs 88, best shown in FIG. 5, are mounted between brackets 89 which are affixed to the casement 22 and the sides 79 of the door 26. The springs 88 cause the sector-shaped door 26 to close when the door handle 84 has been released. The bumper 91 mounted on the bumper bracket 93 limits the travel of the sector-shaped door, and brings it to a stop in the open position. A book guide surface 90 is formed by the first surface 76 and the second surface 78 which, when the door 26 is closed, inclines generally downward towards the rear opening 92. A book 40 placed by a depositor on the guide surface when the sector-shaped door is in the open position (see FIG. 7) will slide down the guide surface 90 through the rear discharge opening 92 when the door 26 is closed, as shown in in FIG. 8.

The rear discharge opening 92 is covered by a gate 94 which is mounted on a horizontal pivot 96 so as to block the rear discharge opening 92 when the gate 94 is closed. The gate 94 has attached to it a guide bar or guide tabs 102. The guide tabs 102 may be an attached bar or, as in the preferred embodiment, a stiffened extended portion formed by doubling over the metal of the gate 94.

When the door 26 is open or partly open the gate 94, by means of the attached guide tabs 102 is prevented from opening by an inner guide surface 98 which in the preferred embodiment is the inner surface of a baffle 99 which is part of the casement 22. The inner guide surface 98 is formed by that part of the casement 22 that surrounds the rear opening 92. This surface is spaced from the door 26 and does not interfere with the door throughout its range of motion. This surface 98 is also cut away so that in the closed position the gate 94 can freely swing open allowing books 40 to pass through.

When the door 26 is opened the inner guide surface 98 is so closely spaced from the gate 94 and the guide tabs 102 that the gate 94 cannot be lifted by an inserted hand or finger or other object to reveal the rear opening 92. As a result, when the door 26 is opened, nothing can pass through into the interior chamber 100 of the chest 20.

Figure 9:
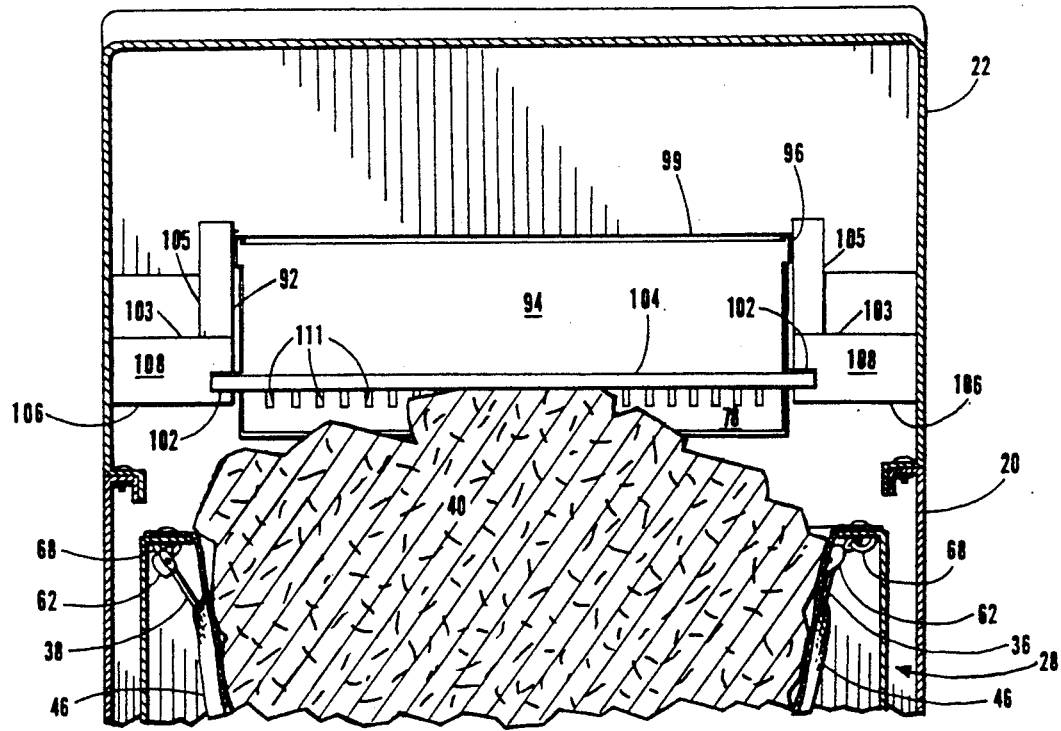
FIG. 9 is a rear elevational view of the book deposit of FIG. 5 taken along section lines 9—9, showing the deposit container full, and the deposit door locked.

An outer guide surface 108 is formed by an upward extension from the casement 22. The outer guide surface may be formed by triangular plates fixed on either side of the rear opening 92 to engage the guide tabs 102 when the container 28 is full, or preferably will be a rigid plate extension 103 on either side of the rear opening 92 which may be additionally stiffened by the provision of a welded stiffening bracket 105 extending between the casement 22 and the rigid plate extension 103. The guide tabs 102 extend from the edge of the gate 104 so that when the gate 94 is held open by a book 40, as shown in FIGS. 8-10, the gate guide tabs 102 are forced past the apex 106 where the outer guide surface 108 joins the inner guide surface 98 pushing the gate up along the outer guide surface 108. When the guide tabs 102 of the gate 94 are blocked from upward and forward movement by the outer guide surface 108, significant opening of the door 26 is prevented. Any attempt to open the door 26 would then result in the tabs 102 and hence the gate 94 being held up by the plate extensions 103. Forward motion of the gate 94 and the door 26 to which the gate is connected is then no longer possible. Although a slight opening may be possible before the guide tabs 102 engage the outer guide surfaces 108, the casement overhang 110 prevents any access to the chamber 80 formed by the sector-shaped door.

There are thus two instances when the return 18 will be locked against opening the door 26. During operation, as shown in FIG. 8, after the door 26 has been released by the depositor the book 40, while sliding from the book guide surface 90 into the bag 36, will momentarily deflect the gate 94 upwards and the door 26 will be prevented from opening. Once the deposited book has passed through the discharge opening 92 the door will be again free to open.

It is important to note, however, that if the book 40 is prevented from passing fully through the discharge opening 92, as shown in FIG. 9, or is prevented from passing fully from under the gate 94, the return will be permanently locked until the container 28 is removed from the chest 20. The door 26 will be so blocked if the container 28 is so fully loaded that the previously deposited books themselves block further entry of books.

The return 18 of this invention thus prevents its excessive loading. A facility which has heavy return use can thus place two or more returns in a common location so that a depositer, instantly alerted to the fullness of one return by its resistance to opening, may deposit his book in a neighboring return.

Drip holes 111 are provided in the door 26 which pass any moisture which enters the sector-shaped door through the guide surface 90 and by means of a drip baffle 112 deflect the water from the removable book container 28. The overhang 110 in addition to preventing access to the sector-shaped door unless it opens fully also functions as a rain shield preventing water from entering the sector-shaped door when it is closed.

The gate 94 blocking the rear opening 92 of the sector-shaped deposit door 26 may be biased in such a way that very light objects, such as a book of lit matches, will not pass through to the book storage container 28 and so will harmlessly extinguish itself within the confines of the sector-shaped door 26.

It should be noted that the casement, door, guide surface, gate and tab assembly of the book return of this invention may equally well be fitted to a wall-mounted book return for passage of books through a wall into a receiving bin. Although the removable container and the collapsible bag have been shown to have a rectangular plan, polygonal and cylindrical bags and like-shaped containers may also be employed.

It is understood that the invention is not confined to the particular construction or arrangement of parts herein illustrated and described, but embraces such modified forms thereof as come within the scope of the following claims.

We claim:
1. A book return comprising:
   a) a casing defining a door compartment having a frontal access opening and a rear discharge opening;
   b) a sector-shaped door having a book guide surface, the door being attached to the casing about a horizontally pivoted axis near the bottom of the casing between the frontal access opening and the rear discharge opening, the door being pivotally movable between closed and open positions;
   c) a gate having a top which is horizontally pivotally attached at the gate top to the rear of the door, the gate covering the rear discharge opening;
   d) a guide member extending from the bottom of the gate such that the guide member will be displaced upwardly by a book deposited in the door when the door is in a closed position;
   e) an inner guide surface connected to the casing and spaced form the door and adapted to engage the guide member of the pivoted gate to restrict access past the gate when the door is opened; and
   f) an outer guide surface connected to the casing opposite the inner guide surface, the outer guide surface engaging and constraining the upwardly displaced guide member of the gate as the door is pivoted to prevent the door from opening, such that the door will freely open when the gate is not displaced by a book but will be prevented from opening when the gate is so displaced.

2. The book return of claim 1 wherein the inner guide surface and outer guide surface meet at a downwardly facing apex.

3. The book return of claim 1 wherein a baffle is located behind and above the sector-shaped door and has an inner surface which functions as the inner guide surface and which has upwardly extending protrusions which form the outer guide surface.

4. The book return of claim 3 wherein the rear discharge opening is partially defined by portions of the baffle.

5. A book receptacle in a book return comprising:
   a) a support structure defining a volume open at the top and having an upper peripheral edge;
   b) a collapsible container having a bottom which, in the uncollapsed state, substantially fills the volume defined by the support structure, the collapsible container being open at the top and having an upper peripheral edge which is affixed to the support upper peripheral edge; and
   c) an elastic load responsive support extending from a first attachment point located at the bottom of the collapsible container through a pulley attached to the support upper edge over which it runs and extends to a second attachment point located on the support structure and spaced from the pulley, wherein the collapsible container is held in a substantially collapsed condition by the load responsive support when the container is empty and as the container is loaded with books expands to fill substantially the volume defined by the support structure.

6. The book receptacle for a book return of claim 5 wherein the collapsible container is a flexible fabric bag.

7. The book receptacle for a book return of claim 6 wherein the bottom of the bag is held extended by a frame which holds the bottom of the collapsible bag in a substantially planar configuration.

8. A book receptacle in a book return comprising:
   a) a support structure defining a volume open at the top and having an upper peripheral edge;
   b) a collapsible container having a bottom which, in the uncollapsed state, substantially fills the volume defined by the support structure, the collapsible container being open at the top and having an upper peripheral edge which is affixed to the support upper peripheral edge; and
   c) a load responsive support, providing load responsive support between a first attachment point located at the bottom of the collapsible container and a second attachment point located on the support structure and spaced from the first attachment point, wherein the collapsible container is held in a substantially collapsed condition by the load responsive support when the container is empty and as the container is loaded with books expands to fill substantially the volume defined by the support structure, and wherein the load-responsive support is an elastic cord with a first attachment point connected to the bottom o the collapsible container, and wherein the elastic cord runs through a pulley attached to the support upper edge and is turned substantially 90° and is attached at its second attachment point to an attachment bracket located on the support upper edge spaced from the pulley.

9. A book receptacle in a book return comprising:
   a) a support structure defining a volume open at the top and having an upper peripheral edge;

b) a collapsible container having a bottom which, in the uncollapsed state, substantially fills the volume defined by the support structure, the collapsible container being open at the top and having an upper peripheral edge which is affixed to the support upper peripheral edge; and c) a load responsive support, providing load responsive support between a first attachment point located at the bottom of the collapsible container and a second attachment point located on the support structure and spaced from the first attachment point, wherein the collapsible container is held in a substantially collapsed condition by the load responsive support when the container is empty and as the container is loaded with books expands to fill substantially the volume defined by the support structure, and wherein the support structure has a bottom and four substantially vertical sides, and the support upper edge has four corners wherein the collapsible container is a fabric bag with fours ides and a bottom and having an upper periphery which is attached to the support upper edge by snaps and the bag is supported by elastic cords connected at each of the four corners of the bottom of the collapsible bag wherein each elastic cord follows a path substantially vertical until it reaches a pulley attached to the support upper corners wherein the pulley turns the elastic cord through substantially 90 degrees and the elastic cord is attached to an anchor bracket on an adjacent corner.

10. A book return comprising:
a) a chest defining an interior chamber;
b) a storage container in the interior chamber for storing books;
c) a casing defining a door compartment having a frontal access opening and a rear discharge opening mounted above the chest;
d) a sector-shaped door having therein a book guide surface, the door being pivotally attached tot he casing about a horizontal axis near the bottom of the casing between the frontal access opening and the rear discharge opening, the door being pivotally movable between closed and open positions;
e) a gate which is horizontally pivotally attached to the rear of the sector-shaped door, the unpivoted gate blocking the rear discharge opening;
f) a guide member connected to the bottom of the gate;
g) an inner guide surface connected to the casing, the inner guide surface constraining the gate guide member when the sector-shaped do<sup>.</sup> is opened so that the gate remains closed and access to the interior chamber is denied; and
h) an outer guide surface connected to the casing opposite the inner guide surface and meeting the inner guide surface at a downwardly facing apex, wherein when a book is unable to pass completely through the gate the guide member is forced pas the apex and engages the outer guide surface so that the guide member travels along the outer guide surface, preventing the sector-shaped door from pivoting to a position where frontal access is possible and so locking the sector-shaped door in a closed position.

11. The book return of claim 10 wherein the storage container comprises:

a) a support structure defining a right prismatic volume open at the top and having an upper circumferential edge;

b) a collapsible container with a bottom which, in the uncollapsed state, substantially fills the volume defined by the support structure, the container being open at the top and having an upper peripheral edge which is affixed to the support structure upper peripheral edge; and c) a load responsive support, providing load responsive support between a first attachment point and a second attachment point, the first attachment point being connected to the bottom of the container and the second attachment point being connected to the support structure wherein the container is held in a substantially collapsed condition by the load responsive support when the container is empty and as the container is loaded with books expands to fill substantially the volume defined by the support structure.

12. The book return of claim 11 wherein the collapsible container is a flexible fabric bag.

13. The book return of claim 12 wherein the bottom of the bag is held extended by a frame which holds the bottom of the collapsible bag in a substantially planar configuration.

14. The book return of claim 11 wherein the load-responsive support is an elastic cord with a first attachment point connected to the bottom of the collapsible container, and wherein the elastic cord runs through a pulley attached to the support upper edge and is turned substantially 90° and is attached at its second attachment point to an attachment bracket located on the support upper edge spaced from the pulley.

15. The book return of claim 11 wherein the support structure has a bottom and four substantially vertical sides, and the support upper edge has four corners wherein the collapsible container is a fabric bag with four sides and a bottom and having an upper periphery which is attached to the support upper edge by snaps and the bag is supported by elastic cords connected at each of the four corners of the bottom of the collapsible bag wherein each elastic cord follows a path substantially vertical until it reaches a pulley attached to the support upper corners wherein the pulley turns the elastic cord through substantially 90 degrees and the elastic cord is attached to an anchor bracket on an adjacent corner.

16. A book return comprising:
a) a chest defining an interior volume:
b) a casing defining a door compartment having a frontal access opening and a rear discharge opening;
c) a book receptacle in the volume defined by the chest having a support structure defining a volume open at the top and having an upper peripheral edge and a collapsible container having a bottom, which, in the uncollapsed state, substantially fills the volume defined by the support structure, the collapsible container being open at the top and having an upper peripheral edge which is affixed to the support upper peripheral edge, a load-responsive support providing load-responsive support between a first attachment point located at the bottom of the collapsible container and a second attachment point located on the support structure and spaced from the first attachment point, wherein the collapsible container is held in a substantially collapsed condition by the load-responsive support when the container is empty and as the container is loaded expands to fill substantially the volume defined by the support structure;

d) a sector-shaped door having a book guide surface, and attached to the casing about a horizontally-pivoted axis near the bottom of the casing between the frontal access opening and the rear discharge opening, the door being pivotally movable between closed and open positions;

e) a gate which is horizontally pivotally attached to the rear of the door and the gate may pivot to permit or prevent the passage of books through the rear discharge opening;

f) a guide member attached to the bottom of the gate such that the guide member will be displaced by a book passing under and lifting the gate;

g) a baffle connected to the casing having an inner guide surface and spaced from the door, and adapted to restrict access past the gate when the door is open; and h) an outer guide surface connected to the casing opposite the inner guide surface, the outer guide surface constraining the displaced guide member as the door is opened to prevent the door from opening, such that the door will freely open when the gate is not lifted by a book but will be prevented from opening when the gate is lifted.

17. The book return of claim 16 wherein the inner guide and outer guide surface meet at a downwardly facing apex.

18. The book return of claim 16 wherein a baffle is located behind and above the sector-shaped door and has an inner surface which functions as the inner guide surface and which has upwardly extending protrusions which form the outer guide surface.

19. The book return of claim 18 wherein the rear discharge opening is partially defined by portions of the baffle.

20. A collapsible bag for a book receptacle in a book return comprising:

a) a cloth bag defining a volume open at the top, the bag having four sides, a bottom and an upper edge;

b) a plurality of fasteners located on the upper edge of the bag adapted to fasten the bag to a book return receptacle;

c) a cloth surface attached to the bottom of the bag defining a pocket into which may be installed a stiffening frame for the purpose of holding the bottom of the bag substantially flat;

d) four sleeves attached to the corners of the bag defined by adjacent sides, the pockets being adapted to containing and guiding an elastic cord connected to the receptacle; and e) reinforcing straps attached to the bag bottom and having attachment points closely spaced from the sleeves and adapted to attach to elastic cords running in the sleeves to permit the bag bottom to be supported by the cords.

* * * * *